(12) United States Patent
Xu

(10) Patent No.: US 12,538,026 B2
(45) Date of Patent: Jan. 27, 2026

(54) CAMERA APPARATUS AND ELECTRONIC DEVICE

(71) Applicant: VIVO MOBILE COMMUNICATION CO., LTD., Guangdong (CN)

(72) Inventor: Nenghua Xu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 182 days.

(21) Appl. No.: 18/485,473

(22) Filed: Oct. 12, 2023

(65) Prior Publication Data

US 2024/0040252 A1    Feb. 1, 2024

Related U.S. Application Data

(63) Continuation of application No. PCT/CN2022/086138, filed on Apr. 11, 2022.

(30) Foreign Application Priority Data

Apr. 15, 2021  (CN) .......................... 202110406243.5

(51) Int. Cl.
| | | |
|---|---|---|
| H04N 23/68 | (2023.01) | |
| G02B 7/02 | (2021.01) | |
| H04N 23/51 | (2023.01) | |
| H04N 23/52 | (2023.01) | |
| H04N 23/54 | (2023.01) | |

(52) U.S. Cl.
CPC ........... *H04N 23/685* (2023.01); *G02B 7/023* (2013.01); *H04N 23/51* (2023.01); *H04N 23/52* (2023.01); *H04N 23/54* (2023.01)

(58) Field of Classification Search
None
See application file for complete search history.

(56) References Cited

U.S. PATENT DOCUMENTS 8,248,497 B2 *  8/2012  Tanimura ................. G03B 5/00
                                                   348/208.99
11,122,205 B1 *  9/2021  Sharma ................... H04N 23/54
(Continued)

FOREIGN PATENT DOCUMENTS

| CN | 204156945 U | 2/2015 |
|---|---|---|
| CN | 107529015 A | 12/2017 |

(Continued)

*Primary Examiner* — Rodney E Fuller
(74) *Attorney, Agent, or Firm* — Price Heneveld LLP

(57) ABSTRACT

A camera apparatus includes: a lens, a mounting frame, a first driving member, an anti-shaking driving mechanism, a second driving member, and a photosensitive chip. The lens penetrates the mounting frame. The first driving member is disposed on the mounting frame. The lens and the photosensitive chip are disposed sequentially in a direction of an optical axis of the lens. The anti-shaking driving mechanism includes a substrate, an anti-shaking elastic member, and a base. The substrate is movably connected to the base through the anti-shaking elastic member. Both the photosensitive chip and the second driving member are disposed on the substrate. Therefore, the first driving member is enabled to drive the substrate through the second driving member, thereby enabling the photosensitive chip to follow the substrate for anti-shaking motion.

20 Claims, 7 Drawing Sheets

(56) References Cited

U.S. PATENT DOCUMENTS

| | | | | |
|---|---|---|---|---|
| 11,792,516 B1* | 10/2023 | Patel | ...................... | H04N 23/54 |
| | | | | 348/294 |
| 11,906,810 B2* | 2/2024 | Wang | ...................... | G01B 7/003 |
| 12,132,065 B2* | 10/2024 | Park | ...................... | H04N 23/55 |
| 12,143,726 B2* | 11/2024 | Xu | ...................... | H04N 23/687 |
| 2006/0017815 A1* | 1/2006 | Stavely | ................ | H04N 23/687 |
| | | | | 348/208.7 |
| 2012/0099201 A1* | 4/2012 | Chan | ...................... | G02B 7/04 |
| | | | | 359/557 |
| 2019/0141248 A1* | 5/2019 | Hubert | ............... | H02K 41/0356 |
| 2019/0289180 A1 | 9/2019 | Wang | | |
| 2020/0036898 A1* | 1/2020 | Kuo | ...................... | H04N 23/55 |
| 2020/0314338 A1* | 10/2020 | Johnson | ................ | H04N 23/68 |
| 2023/0092048 A1 | 3/2023 | Xu | | |

FOREIGN PATENT DOCUMENTS

| | | |
|---|---|---|
| CN | 108174078 A | 6/2018 |
| CN | 110780507 A | 2/2020 |
| CN | 210573119 U | 5/2020 |
| CN | 211266979 U | 8/2020 |
| CN | 111654603 A | 9/2020 |
| CN | 111683454 A | 9/2020 |
| CN | 112468732 A | 3/2021 |
| CN | 113114896 A | 7/2021 |
| CN | 113114901 A | 7/2021 |

* cited by examiner

CAMERA APPARATUS AND ELECTRONIC DEVICE

CROSS-REFERENCE TO RELATED APPLICATIONS

The present application is a continuation application of International Application No. PCT/CN2022/086138, filed on Apr. 11, 2022. International Application No. PCT/CN2022/086138 claims priority to Chinese Patent Application No. 202110406243.5, filed with the China National Intellectual Property Administration on Apr. 15, 2021, and entitled "CAMERA APPARATUS AND ELECTRONIC DEVICE". Each of the above-listed applications is incorporated herein by reference in its entirety.

TECHNICAL FIELD

This application relates to the field of electronic devices, and in particular, to a camera apparatus and an electronic device.

BACKGROUND

With the development of science and technology, anti-shaking demand for camera apparatuses is increasing. One of existing anti-shaking technologies is implemented based on motion of a chip. Compared with an anti-shaking technology that is implemented based on motion of a lens, this anti-shaking technology has the following advantages: Because the chip is smaller and lighter, power consumed in driving the chip to move for shake prevention is less, and an entire anti-shaking mechanism can be designed smaller. Therefore, the chip motion-based anti-shaking technology is widely applied to camera apparatuses, helping the camera apparatuses implement shake prevention during shooting, and further enabling the camera apparatuses to develop toward weight reduction and lower power consumption.

However, in a currently used chip-based anti-shaking technology, a hardware structure usually uses a flexible printed circuit (FPC) for connection and conduction of a chip. Because the flexible printed circuit occupies large space due to its own structural feature, an entire chip-based anti-shaking mechanism cannot be further minified. This prevents a camera apparatus provided with the chip-based anti-shaking mechanism from further developing toward weight reduction and miniaturization.

SUMMARY

According to one aspect, this application provides a camera apparatus, including: a lens, a mounting frame, a first driving member, an anti-shaking driving mechanism, a second driving member, and a photosensitive chip. The lens penetrates the mounting frame. The first driving member is disposed on the mounting frame. The lens and the photosensitive chip are disposed sequentially in a direction of an optical axis of the lens. The anti-shaking driving mechanism includes a substrate, an anti-shaking elastic member, and a base. The substrate is movably connected to the base through the anti-shaking elastic member. Both the photosensitive chip and the second driving member are disposed on the substrate. The first driving member drives, through the second driving member, the substrate to move. The photosensitive chip follows the substrate for anti-shaking motion.

According to another aspect, this application provides an electronic device, including the foregoing camera apparatus.

BRIEF DESCRIPTION OF DRAWINGS

The accompanying drawings described herein are intended to provide further understanding of this application, and constitute a part of this application. Example embodiments of this application and descriptions thereof are intended to describe this application, but do not constitute inappropriate limitations to this application. In the accompanying drawings.

REFERENCE NUMERALS

100: housing; 200: lens;
P: focusing drive mechanism;
300: first focusing elastic member; 500: carrier frame; 510: first guide portion; 800: second focusing elastic member;
400: mounting frame; 410: second guide portion; 420: third guide portion;
600: third driving member; 700: first driving member; 900: optical filter; 1000: second driving member;
Q: anti-shaking driving mechanism;
1100: substrate; 1400: base;
1200: anti-shaking elastic member;
1201: substrate layer; 1202: first insulation layer; 1203: first conductive layer; 1204: second insulation layer;
1210: first connecting portion; 1211: first conducting member; 1212: first extension;

1220: elastic anti-shaking portion; 1221: first spring leaf; 1222: first bent portion; 1223: second spring leaf; 1224: second bent portion; 1225: third spring leaf; 1226: third bent portion;

1230: second connecting portion; 1231: second conducting member;

1300: photosensitive chip; X: first direction; Y: second direction; Z: third direction.

DESCRIPTION OF EMBODIMENTS

To make the objectives, technical solutions, and advantages of this application clearer, the following clearly describes the technical solutions of this application with reference to specific embodiments of this application and corresponding accompanying drawings. Apparently, the described embodiments are merely some rather than all of embodiments of this application. All other embodiments obtained by a person of ordinary skill in the art based on embodiments of this application without creative efforts shall fall within the protection scope of this application.

Refer to FIG. 1 to FIG. 13. This application discloses a camera apparatus, including: a lens 200, a mounting frame 400, a first driving member 700, an anti-shaking driving mechanism Q, a second driving member 1000, and a photosensitive chip 1300.

The mounting frame 400 may provide a mounting foundation for related components in the camera apparatus. The lens 200 may be configured to implement shooting and imaging, and may be a common wide-angle lens and the like. Specifically, the lens 200 may penetrate the mounting frame 400; and the first driving member 700 may be disposed on the mounting frame 400. However, the photosensitive chip 1300 may be configured to convert an optical signal of the lens 200 into an electrical signal, so that the camera apparatus can shoot an image. The lens 200 and the photosensitive chip 1300 may be disposed sequentially in a direction of an optical axis of the lens 200.

Figure 8:
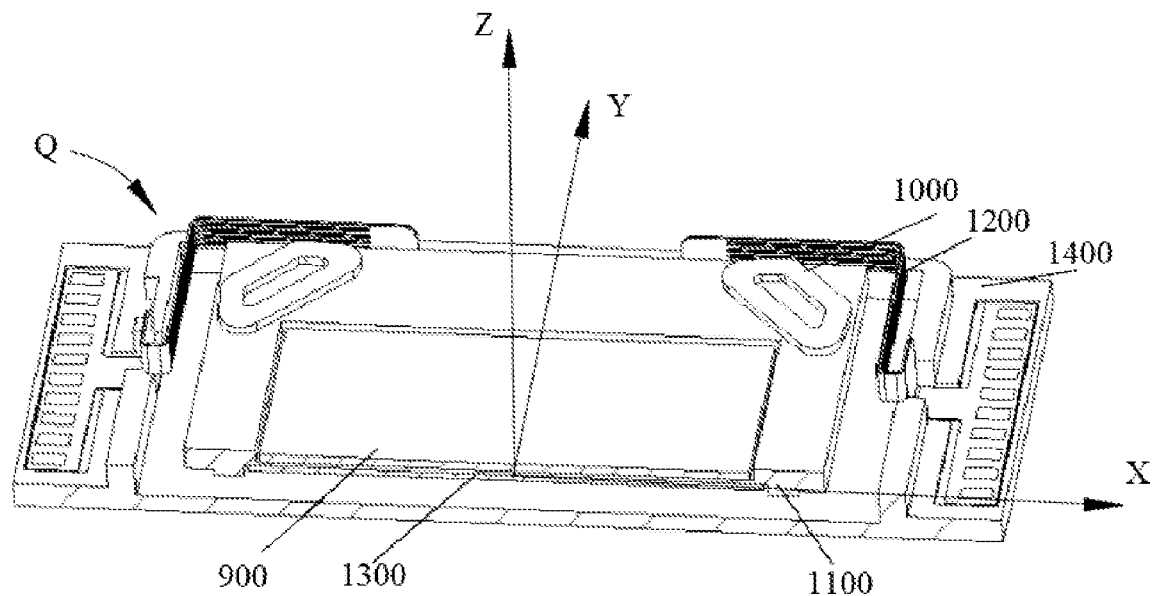
FIG. 8 is a diagram of an inner structure of an anti-shaking mechanism according to an embodiment of this application.
Figure 10:
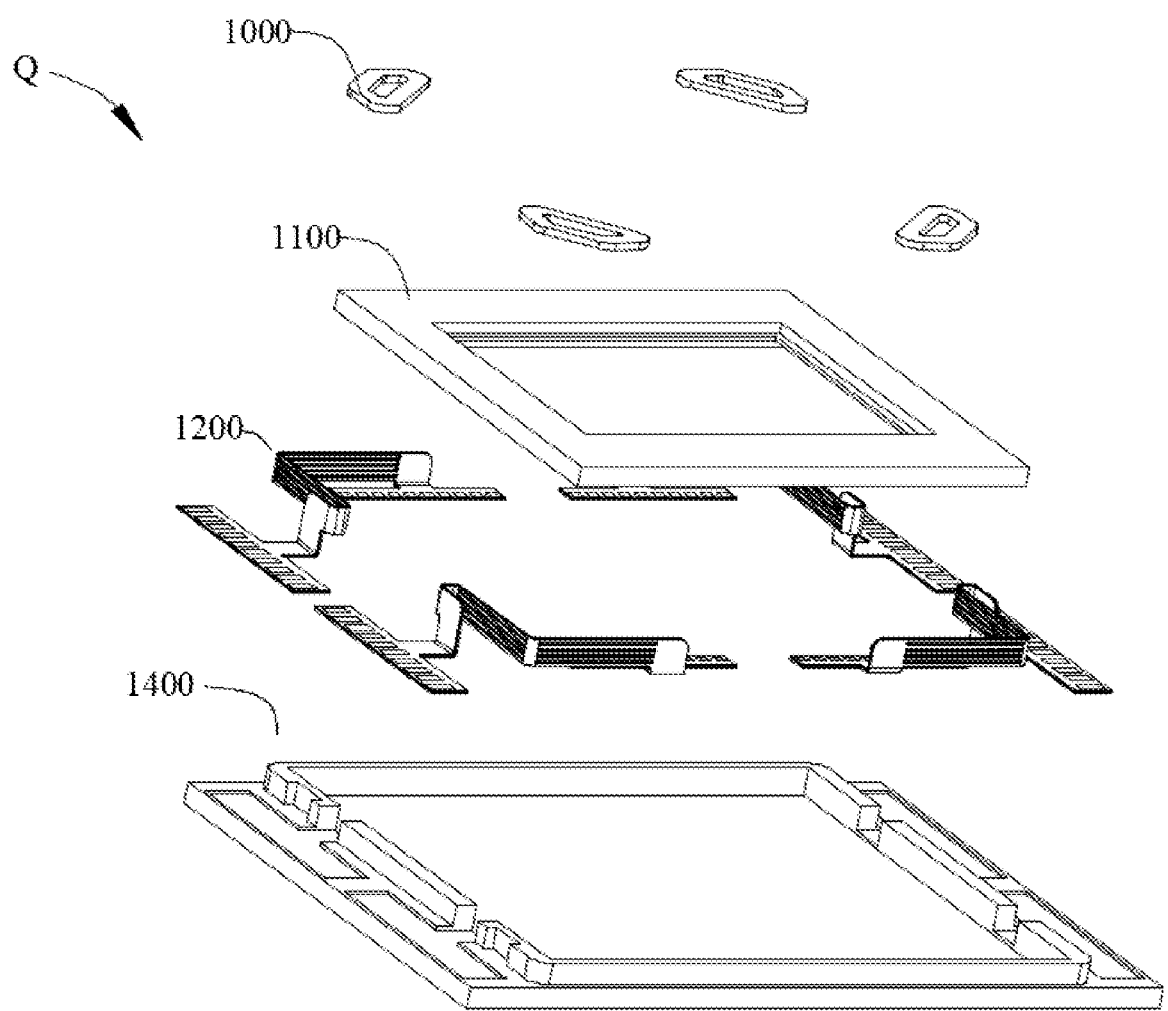
FIG. 10 is an exploded diagram of an anti-shaking mechanism according to an embodiment of this application.
Figure 11:
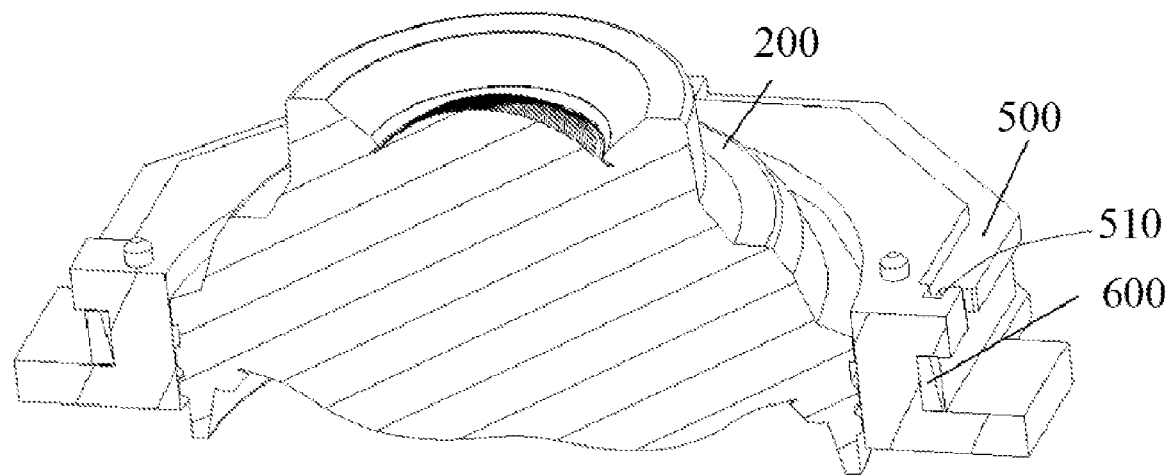
FIG. 11 is a diagram of mounting a third driving member on a carrier frame according to an embodiment of this application.

As shown in FIG. 8 and FIG. 10, the anti-shaking driving mechanism Q is configured to implement anti-shaking motion during image shooting of the camera apparatus. The anti-shaking driving mechanism Q may include a substrate 1100, an anti-shaking elastic member 1200, and a base 1400. The substrate 1100 is used for mounting of the photosensitive chip 1300. The base 1400 is a bearing foundation of the anti-shaking driving mechanism Q. The base 1400 may be specifically made of a liquid crystal high-molecular polymer via injection molding.

By cooperating with each other, the first driving member 700 and the second driving member 1000 may provide a driving force required by motion of the anti-shaking driving mechanism Q. Specifically, the substrate 1100 may be movably connected to the base 1400 through the anti-shaking elastic member 1200. Both the photosensitive chip 1300 and the second driving member 1000 may be disposed on the substrate 1100.

In this way, when driving the second driving member 1000, the first driving member 700 can transfer the driving force to the substrate 1100 through the second driving member 1000, so that the substrate 1100 is enabled to move relative to the base 1400 through the anti-shaking elastic member 1200, that is, the first driving member 700 can drive, through the second driving member 1000, the substrate 1100 to move. Moreover, the photosensitive chip 1300 follows the substrate 1100 for anti-shaking motion, so that shake prevention is implemented in a shooting process of the camera apparatus, and a better shooting quality is achieved.

In summary, the anti-shaking driving mechanism Q and the anti-shaking elastic member 1200 are disposed in this application to connect the substrate 1100 to the base 1400. This manner can minify the overall size of the anti-shaking driving mechanism Q, thereby minifying the overall size of the camera apparatus, and improving an integration level.

Further, the camera apparatus may further include an optical filter 900. The optical filter 900 is disposed between the lens 200 and the photosensitive chip 1300 and can play a light filtering function, so that an image formed by the camera apparatus is better.

Figure 4:
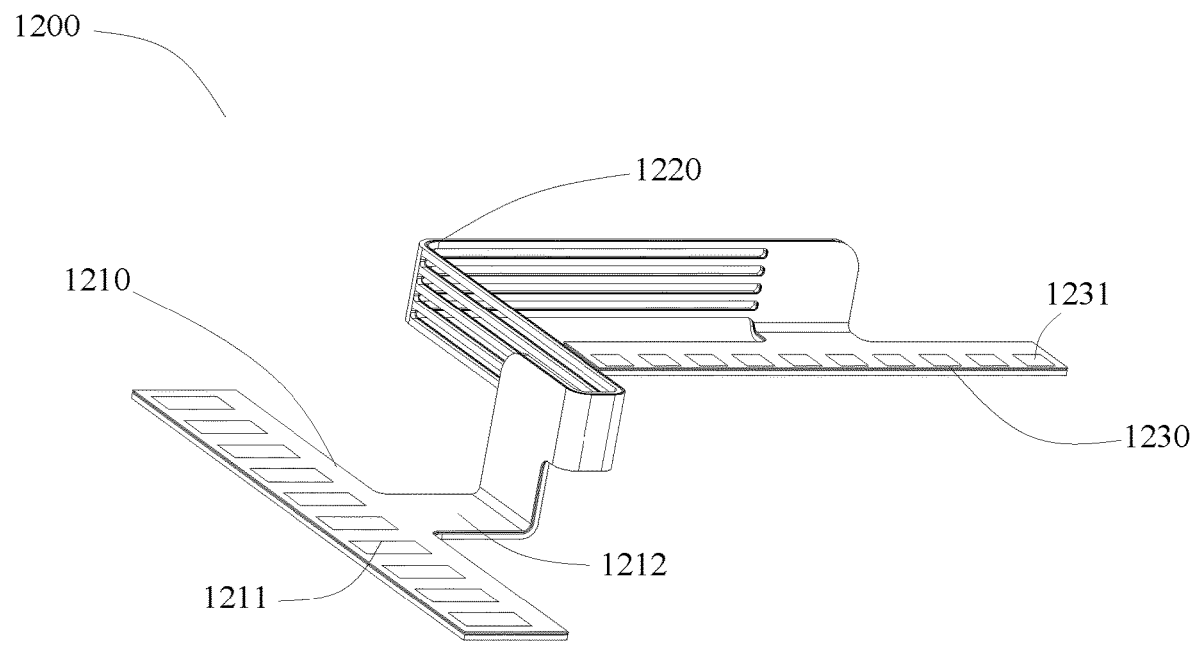
FIG. 4 is a diagram of an overall structure of an anti-shaking elastic member according to an embodiment of this application.
Figure 5:
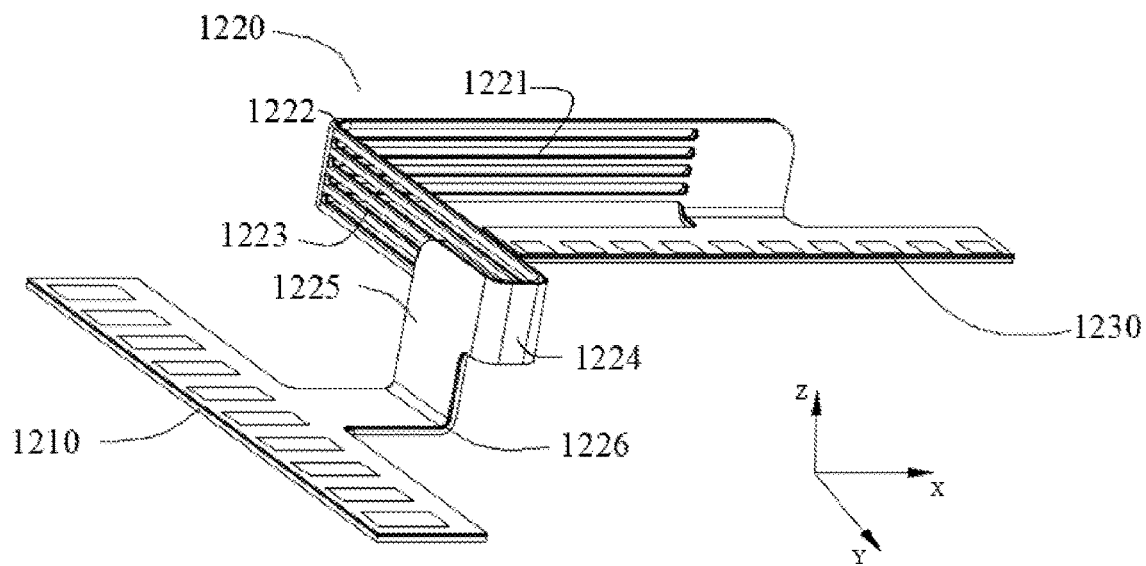
FIG. 5 is a diagram of composition of an elastic anti-shaking portion according to an embodiment of this application.

For a specific structure of the anti-shaking elastic member 1200, the anti-shaking elastic member 1200 may be any part that can enable the substrate 1100 to move relative to the base 1400 due to elastic deformation of the anti-shaking elastic member 1200. For example, the anti-shaking elastic member 1200 may be a plurality of springs or elastic gaskets disposed between the substrate 1100 and the base 1400. As shown in FIG. 4 and FIG. 5 of this application, the anti-shaking elastic member 1200 may include a first connecting portion 1210, an elastic anti-shaking portion 1220, and a second connecting portion 1230.

As shown in FIG. 5, the elastic anti-shaking portion 1220 may include a first spring leaf 1221, a first bent portion 1222, and a second spring leaf 1223. The second connecting portion 1230, the first spring leaf 1221, the first bent portion 1222, the second spring leaf 1223, and the first connecting portion 1210 are connected sequentially.

The anti-shaking elastic member 1200 may be connected to the base 1400 through the first connecting portion 1210. In addition, the anti-shaking elastic member 1200 may be further connected to the substrate 1100 through the second connecting portion 1230. In this way, the substrate 1100 is movably connected to the base 1400. Specifically, when anti-shaking motion is required, an included angle between the first spring leaf 1221 and the second spring leaf 1223 changes. The first bent portion 1222 undergoes bending deformation with a change of the included angle, to adjust its own bending degree. When the included angle changes, the first spring leaf 1221 or the second spring leaf 1223 may swing around the first bent portion 1222. Along with the swing, the substrate 1100 is also capable of moving with the change of the included angle between the first spring leaf 1221 and the second spring leaf 1223, thereby enabling the photosensitive chip 1300 to follow the substrate 1100. This achieves the purpose of shake prevention. Moreover, after image shooting is finished, bending and deformation of the first bent portion 1222 are eliminated. The first spring leaf 1221 and the second spring leaf 1223 are reset to initial positions. Similarly, the substrate 1100 and the photosensitive chip 1300 disposed thereon are also reset to initial positions.

Still further, as shown in FIG. 10, a mounting groove may be preformed in the base 1400. The first connecting portion 1210 is embedded in the mounting groove of the base 1400, so that connection between the anti-shaking elastic member 1200 and the base 1400 is firmer. In addition, a same stacking height can be reused to improve the integration level of the camera apparatus. This further reduces the overall size.

More specifically, as shown in FIG. 5, it is specified that the direction of the optical axis of the lens 200 is a third direction Z, that the first spring leaf 1221 is arranged along a first direction X, and that the second spring leaf 1223 is arranged along a second direction Y. The optical axis of the lens 200, namely, the third direction Z, is perpendicular to a plane defined by the first direction X and the second direction Y. In this way, anti-shaking motion of the photosensitive chip 1300 is specifically motion in the plane perpendicular to the third direction Z, so that a motion path of the photosensitive chip 1300 can be controlled more easily. Still further, every two of the first direction X, the second direction Y, and the third direction Z are orthogonal to each other to form a three-dimensional coordinate system, so that a direction of the anti-shaking motion of the photosensitive chip 1300 can be controlled better.

More specifically, as shown in FIG. 5, the anti-shaking elastic member 1200 may further include a third spring leaf 1225. The third spring leaf 1225 is arranged along a direction parallel to the optical axis of the lens 200. A first end of the second spring leaf 1223 is connected to the first bent portion 1222. A second end of the second spring leaf 1223 is connected to the first connecting portion 1210 through the third spring leaf 1225.

The substrate 1100 can be supported by the third spring leaf 1225, so that the substrate 1100 may be spaced from the base 1400 through the third spring leaf 1225. Therefore, the substrate 1100 is in a suspended state relative to the base 1400. In addition, the lens 200, the photosensitive chip 1300, and the base 1400 are disposed sequentially in the direction of the optical axis of the lens 200, so that the substrate 1100 can move relative to the base 1400 more easily. Therefore, shake prevention of the photosensitive chip 1300 can be more effective.

Still further, as shown in FIG. 5, the anti-shaking elastic member 1200 further includes a second bent portion 1224 and a third bent portion 1226. A first end of the third spring leaf 1225 is connected to the second end of the second spring leaf 1223 through the second bent portion 1224. A second end of the third spring leaf 1225 is connected to the first connecting portion 1210 through the third bent portion 1226.

Due to the multi-bent setting of the anti-shaking elastic member 1200, all of the first bent portion 1222, the second bent portion 1224, and the third bent portion 1226 can undergo bending deformation in a case that the first driving member 700 drives the substrate 1100, so that all of included angles between the first connecting portion 1210 and the third spring leaf 1225, between the second spring leaf 1223 and the third spring leaf 1225, and between the first spring leaf 1221 and the second spring leaf 1223 can change. Then, the substrate 1100 is enabled to move with changes of the included angles, so that shake prevention of the photosensitive chip 1300 can be achieved more easily.

Still further, the substrate 1100 may be a circuit board. The photosensitive chip 1300 is electrically connected to the anti-shaking elastic member 1200 through the substrate 1100. In this way, cooperation between the substrate 1100 and the anti-shaking elastic member 1200 can not only implement shake prevention of the photosensitive chip 1300, but also provide electric energy required by operation of the photosensitive chip 1300, that is, a plurality of functions are realized by using one thing.

Figure 6:
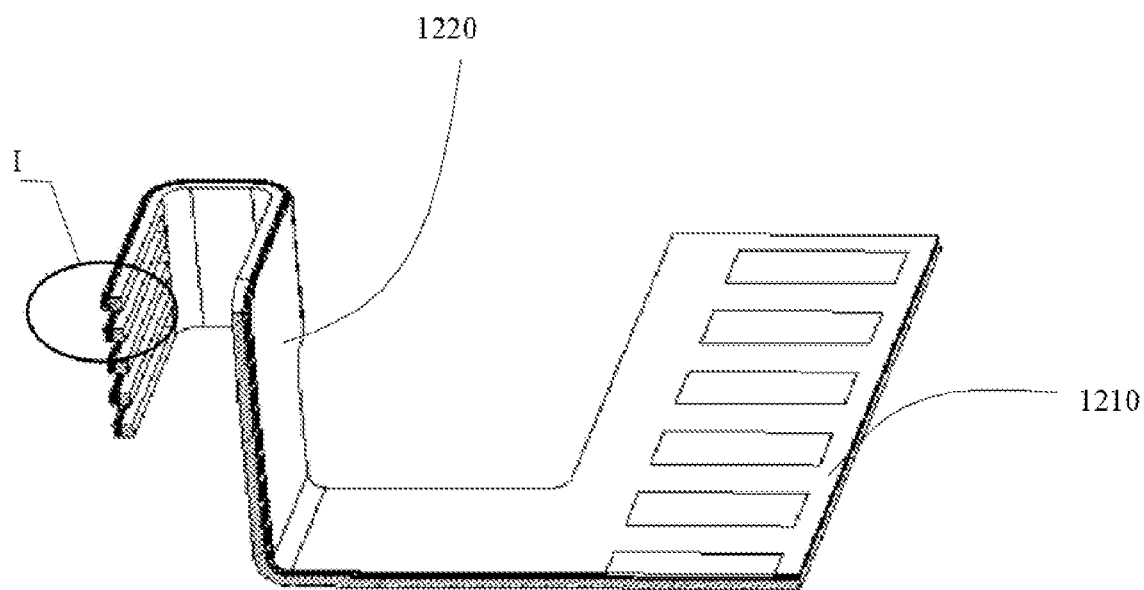
FIG. 6 is a diagram of an inner structure of an anti-shaking elastic member according to an embodiment of this application.
Figure 7:
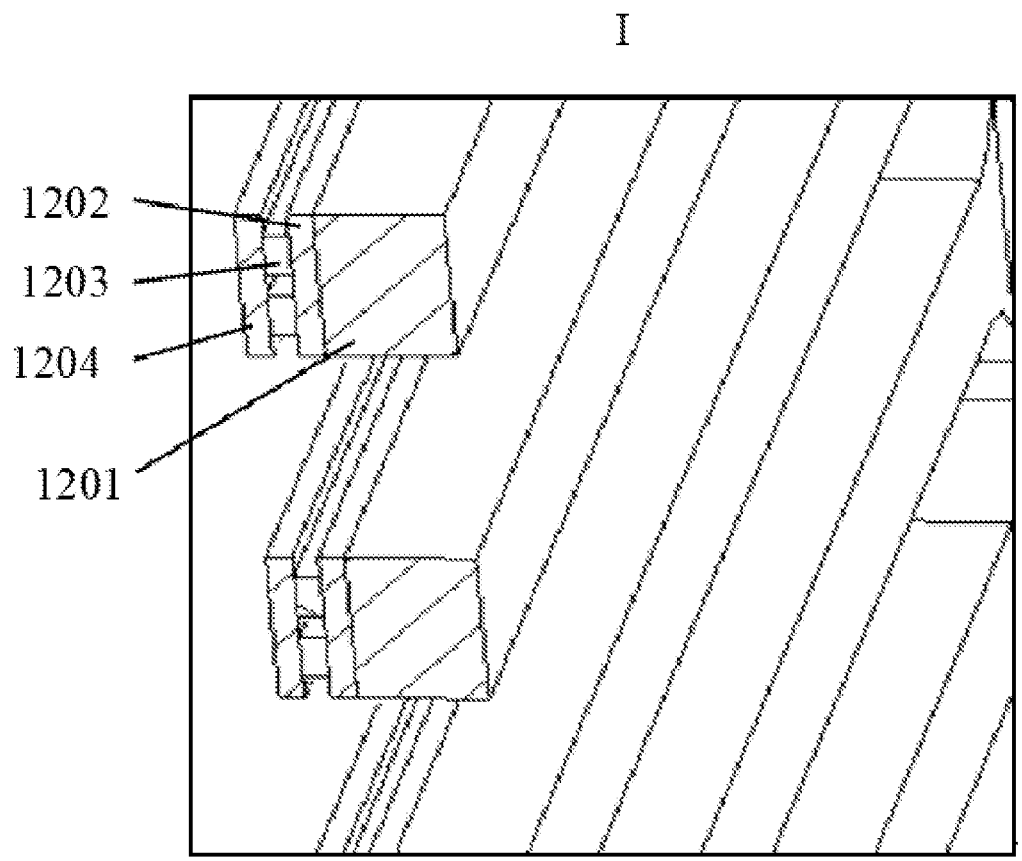
FIG. 7 is an enlarged view of a position I in FIG. 6 according to an embodiment of this application.

In a more specific implementation, the substrate 1100 may be made of a ceramic material. Generally, cabling is disposed in the substrate 1100, to implement electric conduction. Moreover, a metal material is generally disposed in the anti-shaking elastic member 1200, to implement electric conduction. Specifically, as shown in FIG. 6 and FIG. 7, the anti-shaking elastic member 1200 may include a substrate layer 1201 and a first conductive layer 1203 that are superposed sequentially. The substrate layer 1201 is made of a basic material used for shaping, to determine the shape of the anti-shaking elastic member 1200. The first conductive layer 1203 is disposed along the shape defined by the substrate layer 1201, thereby forming cabling on the substrate layer 1201. For example, the first conductive layer 1203 is a copper wire layer or the like. In this way, the anti-shaking elastic member 1200 can be electrically connected to the substrate 1100 through the first conductive layer 1203, so that a conducting loop is formed among the anti-shaking elastic member 1200, the substrate 1100, and the photosensitive chip 1300, to supply power to the photosensitive chip 1300 during work.

Still further, the anti-shaking elastic member 1200 may further include a first insulation layer 1202 and a second insulation layer 1204. The second insulation layer 1204, the first conductive layer 1203, the first insulation layer 1202, and the substrate layer 1201 are superposed sequentially. The first insulation layer 1202 can prevent short circuiting between the first conductive layer 1203 and the substrate layer 1201. For example, the first insulation layer 1202 is made of an inorganic non-metal insulating material. The second insulation layer 1204 can prevent short circuiting between the first conductive layer 1203 and another part in the camera apparatus. For example, the second insulation layer 1204 is pasted on the first conductive layer 1203 by using an electroplated insulating material.

In a more specific implementation, a first conducting member 1211 is disposed on the first connecting portion 1210; and a second conducting member 1231 is disposed on the second connecting portion 1230. Both the first conducting member 1211 and the second conducting member 1231 may be pins used for welding. Via welding, the second connecting portion 1230 is connected to the substrate 1100 through the second conducting member 1231, and the first connecting portion 1210 is connected to the base 1400 through the first conducting member 1211, so that firmness of connection is enhanced. In addition, both the second conducting member 1231 and the first conducting member 1211 may be in contact with the first conductive layer 1203. In this way, the second conducting member 1231 may be connected to the first conducting member 1211 through the first conductive layer 1203, thereby introducing external electric energy into the substrate 1100. Therefore, power is provided for normal operation of the photosensitive chip 1300.

Figure 9:
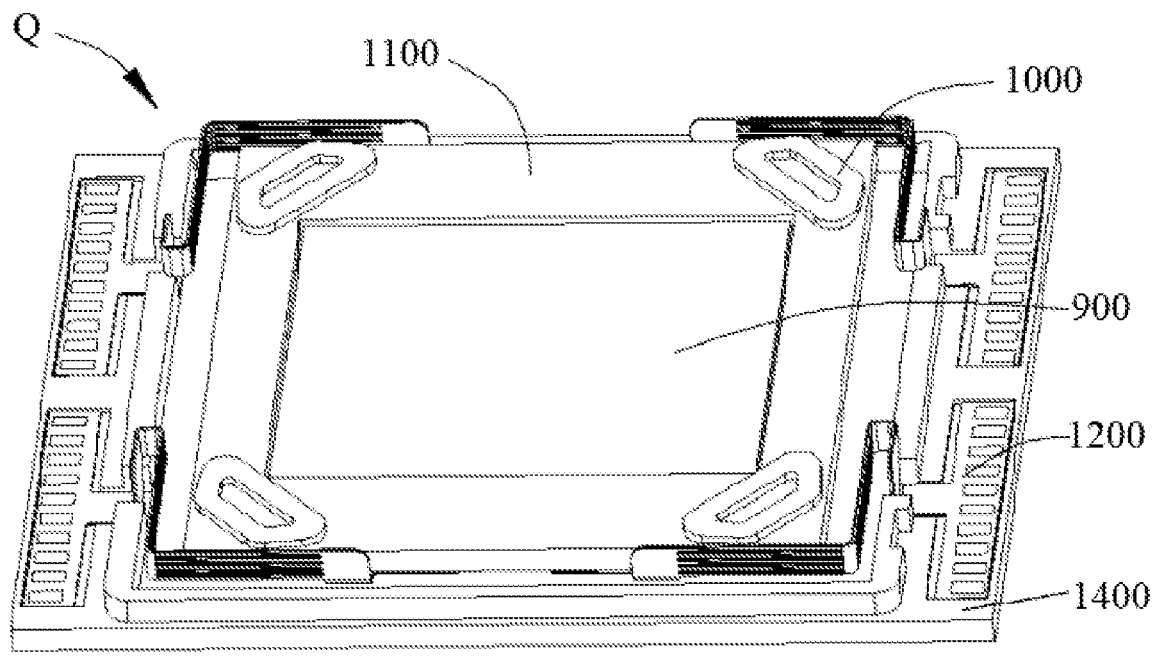
FIG. 9 is a diagram of an overall structure of an anti-shaking mechanism according to an embodiment of this application.

More specifically, as shown in FIG. 5, FIG. 8, and FIG. 9, the second connecting portion 1230 may be disposed on a side, back to the lens 200, of the elastic anti-shaking portion 1220; and a surface, back to the lens 200, of the substrate 1100 is connected to the second connecting portion 1230. In this way, a plane defined by the elastic anti-shaking portion 1220 and the substrate 1100 is perpendicular to the optical axis of the lens 200. This not only ensures stability of connection, but also realizes reuse of a same stacking height by the substrate 1100 and the anti-shaking elastic member 1200. Because the substrate 1100 does not occupy any stacking space, the integration level of the camera apparatus can be improved to further implement miniaturization.

Still further, there may be four anti-shaking elastic members 1200 in total. The four anti-shaking elastic members 1200 are respectively disposed at the corners of the substrate 1100. In this layout structure, the four anti-shaking elastic members 1200 may restrain and cooperate with each other, so that when performing anti-shaking motion, the photosensitive chip 1300 can move along a diagonal line of the substrate 1100. Therefore, a path of the anti-shaking motion of the photosensitive chip 1300 is controlled better. In addition, due to arrangement of the plurality of anti-shaking elastic members 1200, the photosensitive chip 1300 can perform anti-shaking motion more stably.

Figure 1:
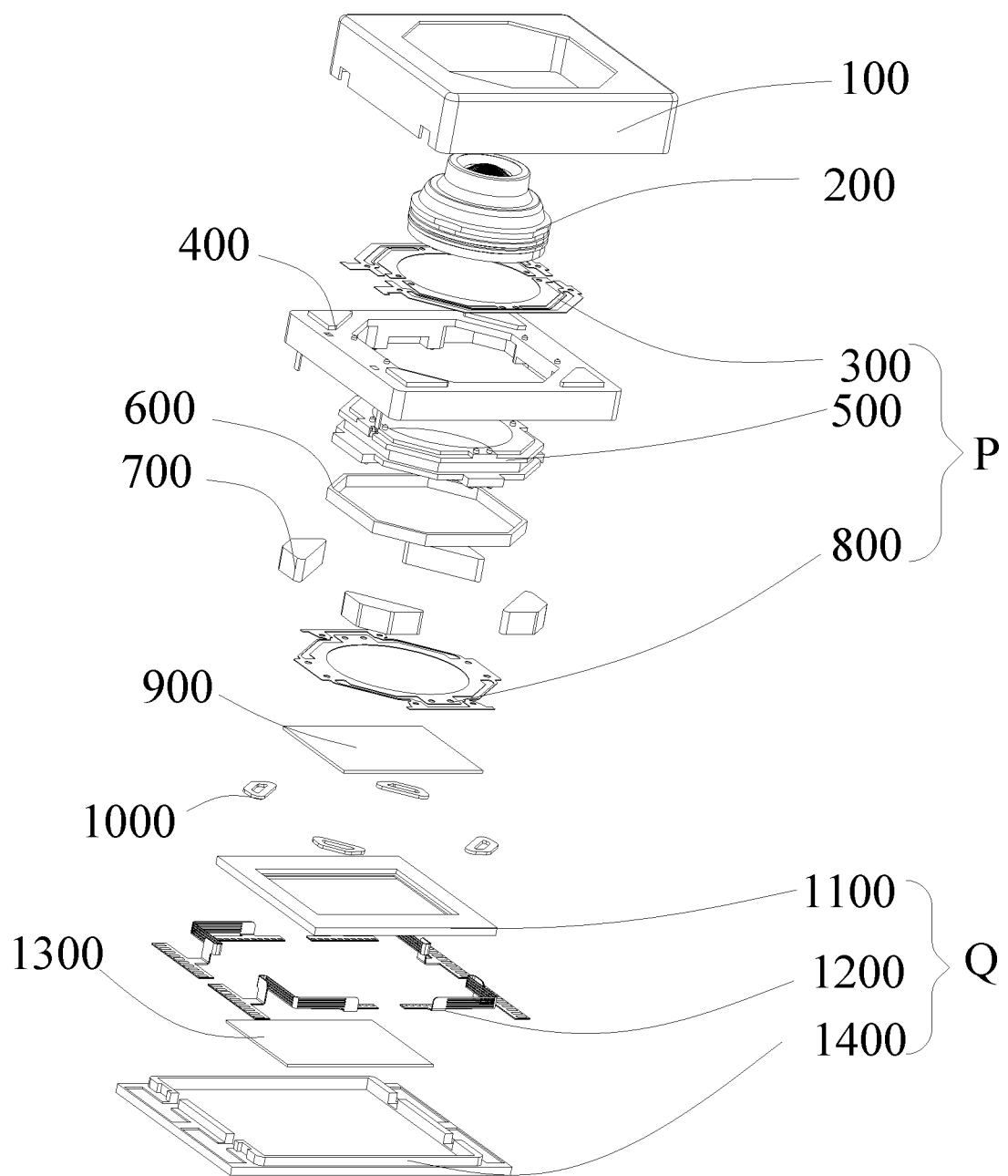
FIG. 1 is an exploded diagram of a camera apparatus according to an embodiment of this application.
Figure 2:
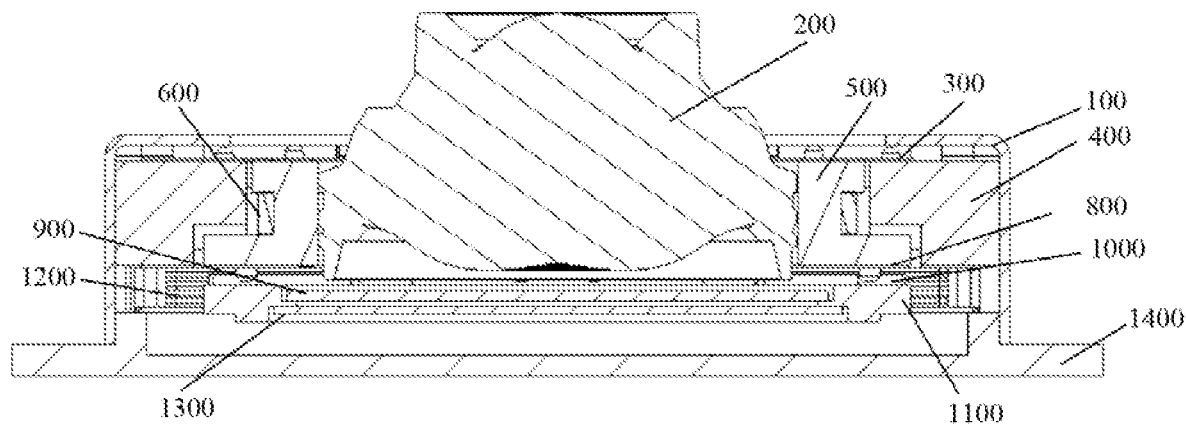
FIG. 2 is a diagram of an inner structure of a camera apparatus according to an embodiment of this application.
Figure 3:
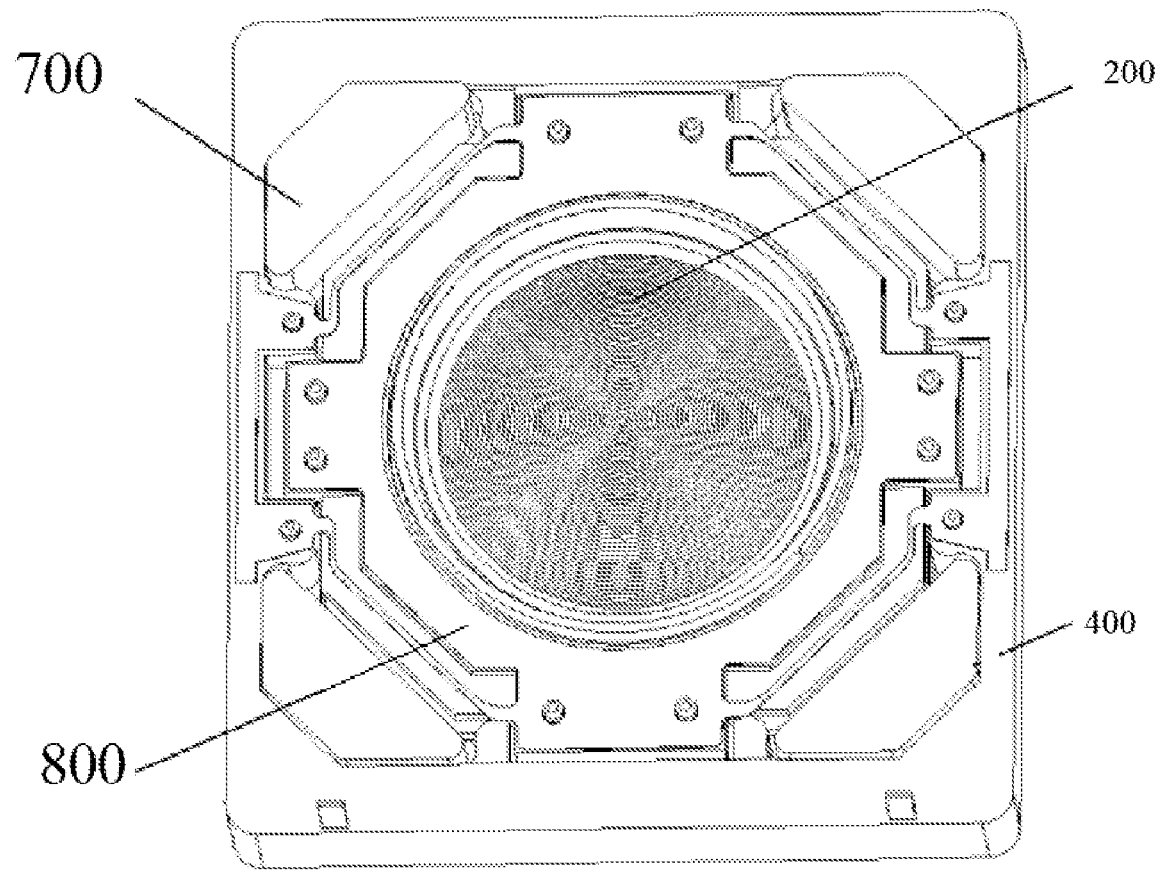
FIG. 3 is a diagram of a mounting position at which a first driving member of a camera apparatus is mounted on a mounting frame according to an embodiment of this application.

In some other optional implementations, as shown in FIG. 1 and FIG. 2, to meet zooming demand of the lens 200 in a shooting process, the camera apparatus may further include a focusing drive mechanism P and a third driving member 600.

The focusing drive mechanism P may include a first focusing elastic member 300, a carrier frame 500, and a second focusing elastic member 800. The carrier frame 500 may be made of a liquid crystal high-molecular polymer. The carrier frame 500 may be a mounting foundation for zooming motion of the lens 200. Specifically, the carrier frame 500 may be disposed between the lens 200 and the mounting frame 400 in a penetrating manner. In addition, the carrier frame 500 and the lens 200 can be secured to each other by means of glue bonding or the like. The carrier frame 500 is elastically connected to the mounting frame 400 through the first focusing elastic member 300 and the second focusing elastic member 800, to realize motion relative to the mounting frame 400. Then, the lens 200 is movably connected to the mounting frame 400 through the carrier frame 500.

By cooperating with each other, the third driving member 600 and the first driving member 700 can provide a driving force required by zooming motion of the lens 200. Specifically, the third driving member 600 may be disposed on the carrier frame 500. In a case that the first driving member 700 drives the third driving member 600, the carrier frame 500 may move along the optical axis of the lens 200 with third driving member 600; the lens 200 may perform focusing motion with the carrier frame 500; and the first focusing elastic member 300 and the second focusing elastic member 800 may guide a direction of the motion of the carrier frame 500, and may undergo bending deformation with the motion of the carrier frame 500. After image shooting is finished, bending and deformation of the first focusing elastic member 300 and the second focusing elastic member 800 are eliminated. The carrier frame 500 drives, with elimination of the deformation, the lens 200 to reset.

In summary, according to this application, the first driving member 700 may cooperate with the second driving member 1000 and the third driving member 600 separately, to respectively implement anti-shaking driving of the photosensitive chip 1300 and zooming driving of the lens 200. Therefore, the first driving member 700 is reused. This further improves the integration level and reduces a size required by the camera apparatus.

Still further, both the first focusing elastic member 300 and the second focusing elastic member 800 can be made of alloy spring leaves. In addition, the first focusing elastic member 300 and the second focusing elastic member 800 may be respectively disposed on an end surface, back to the substrate 1100, of the mounting frame 400 and an end surface, facing the substrate 1100, of the mounting frame 400. In this way, an entirety formed by the first focusing elastic member 300 and the second focusing elastic member 800 clamps the carrier frame 500 from an upper end and a lower end. Alternatively, the first focusing elastic member 300 and the second focusing elastic member 800 are springs or the like disposed in a clearance between the carrier frame 500 and the mounting frame 400.

For a specific driving manner, the first driving member 700 may be a magnet, and both the third driving member 600 and the second driving member 1000 may be electromagnetic coils. Electromagnetic driving is separately performed between the first driving member 700 and the third driving member 600, and electromagnetic driving is separately performed between the first driving member 700 and the second driving member 1000. Therefore, zooming driving of the lens 200 and anti-shaking driving of the photosensitive chip 1300 are realized. Certainly, any other driving manner that can implement motion may be used. Details are not described herein.

In addition, it should be noted that, a groove may be formed in a surface, facing the substrate 1100, of the mounting frame 400, and the first driving member 700 used as a magnet is embedded in the groove. Alternatively, a circular groove is formed in a periphery of the carrier frame 500; and the third driving member 600 used as a coil is disposed in the circular groove in a winding manner, to be disposed around the carrier frame 500. Due to this disposing manner, no extra space needs to be occupied. This further improve the integration level of the apparatus of this application.

Still further, there are four second driving members 1000 in total. The four second driving members 1000 are respectively disposed at the corners of the substrate 1100. Moreover, there are also four first driving members 700 in total, and positions of the first driving members 700 correspond to those of the second driving members 1000. In this way, when the photosensitive chip 1300 performs anti-shaking motion, a driving force thereon is more stable.

Figure 12:
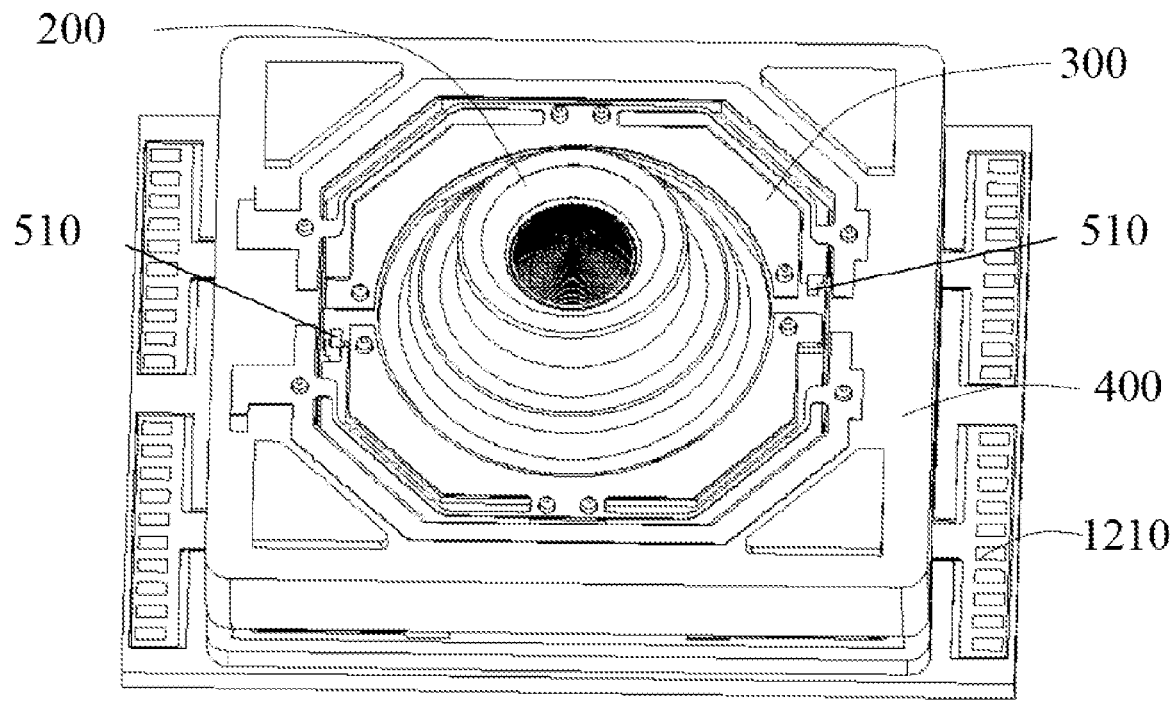
FIG. 12 is a diagram of an overall structure of a camera apparatus according to an embodiment of this application.
Figure 13:
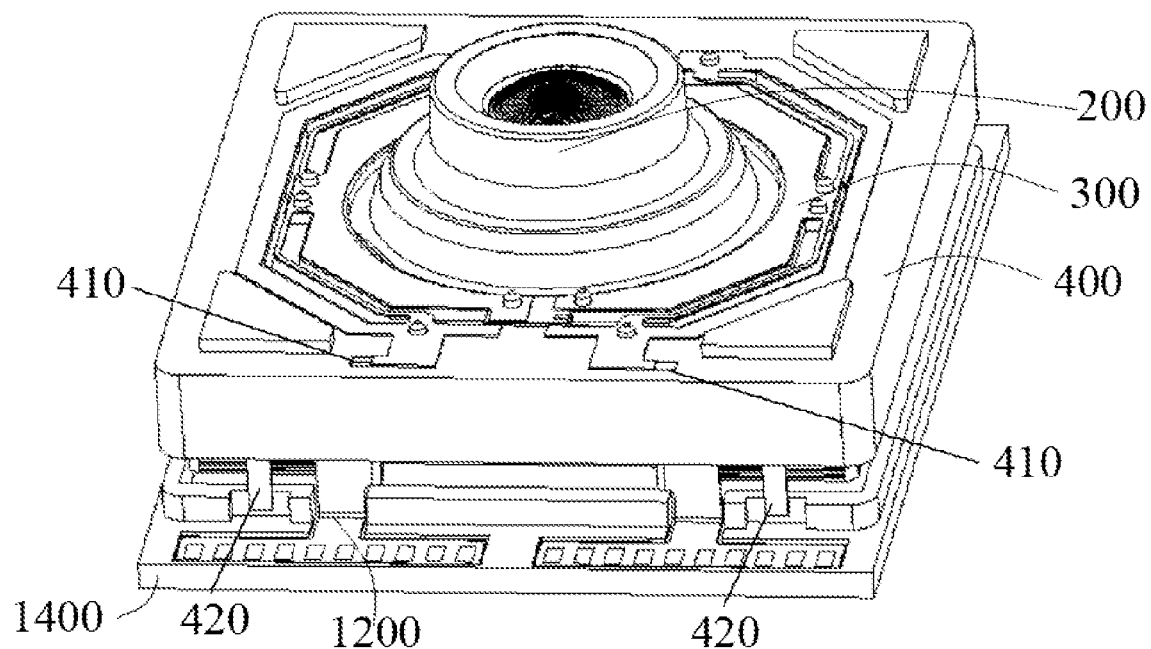
FIG. 13 is a schematic diagram of electric conduction of a third driving member according to an embodiment of this application.

In some other optional implementations, as shown in FIG. 12 and FIG. 13, a first guide portion 510 is disposed in the carrier frame 500; and a second guide portion 410 and a third guide portion 420 are disposed in the mounting frame 400. The guide portion 510 may be a cabling groove formed in the carrier frame 500. The second guide portion 410 and the third guide portion 420 may be plug-in pins disposed on the mounting frame 400. The mounting frame 400 may be connected to the base 1400 through the third guide portion 420, so that the mounting frame 400 and the base 1400 are connected firmly.

The third driving member 600, the first guide portion 510, the first focusing elastic member 300, the second guide portion 410, and the third guide portion 420 are electrically connected in sequence, to form a power supply loop. Therefore, electric energy is introduced into the third driving member 600 to implement zooming motion of the lens 200.

In addition, it should be noted that, when the substrate 1100 is a circuit board, and the second driving member 1000 is an electromagnetic coil, external electric energy may also be transmitted to the second driving member 1000 through the anti-shaking elastic member 1200 and the substrate 1100, that is, a power supply loop formed by the anti-shaking elastic member 1200, the substrate 1100, and the second driving member 1000 can introduce electric energy into the second driving member 1000, thereby implementing anti-shaking motion of the photosensitive chip 1300. It can be learned that the above two power supply loops are independent of each other and do not interfere with each other. This can improve controllability of the camera apparatus of this application.

More specifically, as shown in FIG. 1 and FIG. 2, the camera apparatus may further include a housing 100. The housing 100 may be made of an alloy metal material. The housing 100 can shield, cover, and protect related components on the camera apparatus, to achieve purposes of dust prevention, water resistance, bump-caused damage prevention. Specifically, all of the mounting frame 400, the first driving member 700, the second driving member 1000, and the photosensitive chip 1300 can be disposed in the housing 100; the lens 200 is at least partially disposed in the housing 100; and the anti-shaking driving mechanism Q is at least partially disposed in the housing 100.

In addition, it should be noted that, the first connecting portion 1210 may be stuck out of the housing 100, so that an external current can be introduced into the second driving member 1000 and the photosensitive chip 1300 more easily. Therefore, anti-shaking motion of the photosensitive chip 1300 is implemented; and electric energy is provided for imaging of the photosensitive chip 1300.

Still further, each of the first spring leaf 1221 and the second spring leaf 1223 is provided with a hollow region. Due to arrangement of the hollow regions, entire weight of the anti-shaking elastic member 1200 can be reduced; and convenience is brought for heat dissipation between the anti-shaking elastic member 1200 and the substrate 1100. Specifically, the hollow regions may be through holes formed in the first spring leaf 1221 and the second spring leaf 1223. Moreover, the through holes are respectively formed in length directions of the first spring leaf 1221 and the second spring leaf 1223, namely, the first direction X and the second direction Y. This arrangement can not only ensure entire strength of the first spring leaf 1221 and the second spring leaf 1223, but also facilitate layout cabling of the first conductive layer 1203.

The electronic device in this embodiment of this application may be a phone, a tablet computer, an e-book reader, a wearable device (for example, a smart phone or smart glasses), and the like. The embodiments of this application do not limit the specific type of the electronic device.

The foregoing descriptions are merely embodiments of this application, and are not intended to limit this application. Various changes and modifications may be made to this application by a person skilled in the art. Any modifications, equivalent substitutions, improvements, and the like made within the spirit and principle of this application should be included within the scope of the claims of this application.

What is claimed is:

1. A camera apparatus, comprising: a lens, a mounting frame, a first driving member, an anti-shaking driving mechanism, a second driving member, and a photosensitive chip, wherein
    the lens penetrates the mounting frame, the first driving member is disposed on the mounting frame, and the lens and the photosensitive chip are disposed sequentially in a direction of an optical axis of the lens;
    the anti-shaking driving mechanism comprises a substrate, an anti-shaking elastic member, and a base, wherein the substrate is movably connected to the base through the anti-shaking elastic member, and both the photosensitive chip and the second driving member are disposed on the substrate; and
    the first driving member drives the substrate through the second driving member, and the photosensitive chip follows the substrate for anti-shaking motion;
    wherein the anti-shaking elastic member comprises a first connecting portion, an elastic anti-shaking portion, and a second connecting portion, the elastic anti-shaking portion comprises a first spring leaf, a first bent portion, and a second spring leaf, and the second connecting portion, the first spring leaf, the first bent portion, the second spring leaf, and the first connecting portion are connected sequentially;
    the anti-shaking elastic member is connected to the base through the first connecting portion, and the anti-shaking elastic member is connected to the substrate through the second connecting portion; and
    in a case that the first driving member drives the substrate, an included angle between the first spring leaf and the second spring leaf changes, the first bent portion undergoes bending deformation, and the substrate is capable of moving with a change of the included angle between the first spring leaf and the second spring leaf;
    wherein the anti-shaking elastic member further comprises a third spring leaf, and the third spring leaf is arranged along a direction parallel to the optical axis of the lens;
    a first end of the second spring leaf is connected to the first bent portion, a second end of the second spring leaf is connected to the first connecting portion through the third spring leaf, and the substrate is spaced from the base by the third spring leaf; and
    the lens, the photosensitive chip, and the base are disposed sequentially in the direction of the optical axis of the lens.

2. The camera apparatus according to claim 1, wherein the first spring leaf is arranged along a first direction, and the second spring leaf is arranged along a second direction; and
    the optical axis of the lens is perpendicular to a plane defined by the first direction and the second direction.

3. The camera apparatus according to claim 1, wherein the anti-shaking elastic member further comprises a second bent portion and a third bent portion;
    a first end of the third spring leaf is connected to the second end of the second spring leaf through the second bent portion, and a second end of the third spring leaf is connected to the first connecting portion through the third bent portion;
    in a case that the first driving member drives the substrate, both the second bent portion and the third bent portion are capable of undergoing bending deformation, and both an included angle between the first connecting portion and the third spring leaf and an included angle between the second spring leaf and the third spring leaf are capable of changing; and
    the substrate is capable of moving with a change of the included angle between the third spring leaf and the first connecting portion, and/or, the substrate is capable of moving with a change of the included angle between the third spring leaf and the second spring leaf.

4. The camera apparatus according to claim 1, wherein the substrate is a circuit board, and the photosensitive chip is electrically connected to the anti-shaking elastic member through the substrate.

5. The camera apparatus according to claim 4, wherein the anti-shaking elastic member comprises a substrate layer and a first conductive layer that are superposed sequentially, and the anti-shaking elastic member is electrically connected to the photosensitive chip through the first conductive layer.

6. The camera apparatus according to claim 5, wherein the anti-shaking elastic member further comprises a first insulation layer and a second insulation layer; and
    the second insulation layer, the first conductive layer, the first insulation layer, and the substrate layer are superposed sequentially.

7. The camera apparatus according to claim 5, wherein a first conducting member is disposed on the first connecting portion, and a second conducting member is disposed on the second connecting portion; and
    the second connecting portion is connected to the substrate through the second conducting member, and the second conducting member is connected to the first conducting member through the first conductive layer.

8. The camera apparatus according to claim 1, wherein the camera apparatus further comprises a focusing drive mechanism and a third driving member, and the focusing drive mechanism comprises a first focusing elastic member, a carrier frame, and a second focusing elastic member;

the carrier frame is disposed between the lens and the mounting frame in a penetrating manner, the carrier frame is elastically connected to the mounting frame through the first focusing elastic member and the second focusing elastic member, the lens is movably connected to the mounting frame through the carrier frame, and the third driving member is disposed on the carrier frame; and the first driving member is capable of driving the third driving member, the carrier frame is capable of moving with the third driving member along the optical axis of the lens, the lens follows the carrier frame for focusing motion, and the first focusing elastic member and the second focusing elastic member are capable of undergoing bending deformation with motion of the carrier frame.

9. The camera apparatus according to claim 8, wherein the first driving member is a magnet, and both the third driving member and the second driving member are electromagnetic coils; and electromagnetic driving is separately performed between the first driving member and the third driving member, and the electromagnetic driving is separately performed between the first driving member and the second driving member.

10. The camera apparatus according to claim 9, wherein there are four second driving members in total, the four second driving members are respectively disposed at the corners of the substrate, there are also four first driving members in total, and positions of the first driving members correspond to those of the second driving members.

11. The camera apparatus according to claim 9, wherein the third driving member is arranged around the carrier frame.

12. The camera apparatus according to claim 11, wherein a first guide portion is disposed in the carrier frame, and a second guide portion and a third guide portion are disposed in the mounting frame;

the third driving member, the first guide portion, the first focusing elastic member, the second guide portion, and the third guide portion are electrically connected in sequence; and the mounting frame is connected to the base through the third guide portion.

13. The camera apparatus according to claim 1, wherein the camera apparatus further comprises a housing, and all of the mounting frame, the first driving member, the second driving member, and the photosensitive chip are disposed in the housing; and the lens is at least partially disposed in the housing, and the anti-shaking driving mechanism is at least partially disposed in the housing.

14. The camera apparatus according to claim 1, wherein the second connecting portion is disposed on a side, back to the lens, of the elastic anti-shaking portion, and a surface, back to the lens, of the substrate is connected to the second connecting portion; and a plane defined by the elastic anti-shaking portion and the substrate is perpendicular to the optical axis of the lens.

15. The camera apparatus according to claim 1, wherein there are four anti-shaking elastic members in total, and the four anti-shaking elastic members are respectively disposed at the corners of the substrate.

16. The camera apparatus according to claim 1, wherein each of the first spring leaf and the second spring leaf is provided with a hollow region.

17. An electronic device, comprising the camera apparatus according to claim 1.

18. The electronic device according to claim 17, wherein the anti-shaking elastic member further comprises a second bent portion and a third bent portion;

a first end of the third spring leaf is connected to the second end of the second spring leaf through the second bent portion, and a second end of the third spring leaf is connected to the first connecting portion through the third bent portion;

in a case that the first driving member drives the substrate, both the second bent portion and the third bent portion are capable of undergoing bending deformation, and both an included angle between the first connecting portion and the third spring leaf and an included angle between the second spring leaf and the third spring leaf are capable of changing; and the substrate is capable of moving with a change of the included angle between the third spring leaf and the first connecting portion, and/or, the substrate is capable of moving with a change of the included angle between the third spring leaf and the second spring leaf.

19. The electronic device according to claim 17, wherein the camera apparatus further comprises a housing, and all of the mounting frame, the first driving member, the second driving member, and the photosensitive chip are disposed in the housing; and the lens is at least partially disposed in the housing, and the anti-shaking driving mechanism is at least partially disposed in the housing.

20. The electronic device according to claim 17, wherein the second connecting portion is disposed on a side, back to the lens, of the elastic anti-shaking portion, and a surface, back to the lens, of the substrate is connected to the second connecting portion; and a plane defined by the elastic anti-shaking portion and the substrate is perpendicular to the optical axis of the lens.

* * * * *